United States Patent [19]

Ishihara et al.

[11] Patent Number: 4,520,250

[45] Date of Patent: May 28, 1985

[54] HEATING APPARATUS OF THAWING SENSOR CONTROLLED TYPE

[75] Inventors: Masahiro Ishihara; Mitsuru Watanabe; Shuji Ohkawa; Shunichi Taguchi, all of Yokohama; Itsuo Kikuchi, Ibaraki, all of Japan

[73] Assignee: Hitachi Heating Appliances Co., Ltd., Chiba, Japan

[21] Appl. No.: 467,814

[22] Filed: Feb. 18, 1983

[30] Foreign Application Priority Data

Feb. 19, 1982 [JP] Japan .................................. 57-25603
Jul. 7, 1982 [JP] Japan .................................. 57-118007

[51] Int. Cl.³ ............................................. H05B 6/68
[52] U.S. Cl. .................... 219/10.55 B; 219/10.55 E; 219/10.55 F; 99/325; 99/DIG. 14
[58] Field of Search .................. 219/10.55 B, 10.55 R, 219/10.55 E, 10.55 F, 10.55 A, 10.55 M, 490, 497, 509; 324/58 B, 58 C, 58.5 B, 58.5 C; 340/870.16, 870.17; 99/325, 451, DIG. 14

[56] References Cited

U.S. PATENT DOCUMENTS

| | | | |
|---|---|---|---|
| 2,744,990 | 5/1956 | Schroeder | 324/58.5 B |
| 3,257,614 | 6/1966 | Hankin et al. | 324/58 B |
| 3,320,396 | 5/1967 | Boehm | 219/10.55 B |
| 3,439,431 | 4/1969 | Heidtmann | 219/10.55 B X |
| 3,589,177 | 6/1971 | Merlo | 324/58.5 C |
| 4,009,359 | 2/1977 | Tallmadge et al. | 219/10.55 B |
| 4,196,332 | 4/1980 | MacKay et al. | 219/10.55 B |
| 4,210,795 | 7/1980 | Lentz | 219/10.55 B |

FOREIGN PATENT DOCUMENTS 2917214 11/1979 Fed. Rep. of Germany ... 219/10.55 R

Primary Examiner—Philip H. Leung
Attorney, Agent, or Firm—Antonelli, Terry & Wands

[57] ABSTRACT

Many frozen foods are now sold on the market and also produced by household refrigerators, and most of these frozen foods are eaten after thawing or after cooking under heat subsequent to thawing. The importance of thawing is thus increasing more and more. This invention provides a heating apparatus of simple construction capable of effectively thawing a frozen food to meet the above demand. The heating apparatus of the present invention is based on the fact that the dielectric loss of a frozen food itself varies as the frozen food is progressively heated. In the heating apparatus, a signal wave is directed toward a frozen food, and the variation of the rate of absorption of the signal wave due to the dielectric loss of the food is measured, so as to automatically control the process of heating for thawing on the basis of the result of measurement.

29 Claims, 15 Drawing Figures

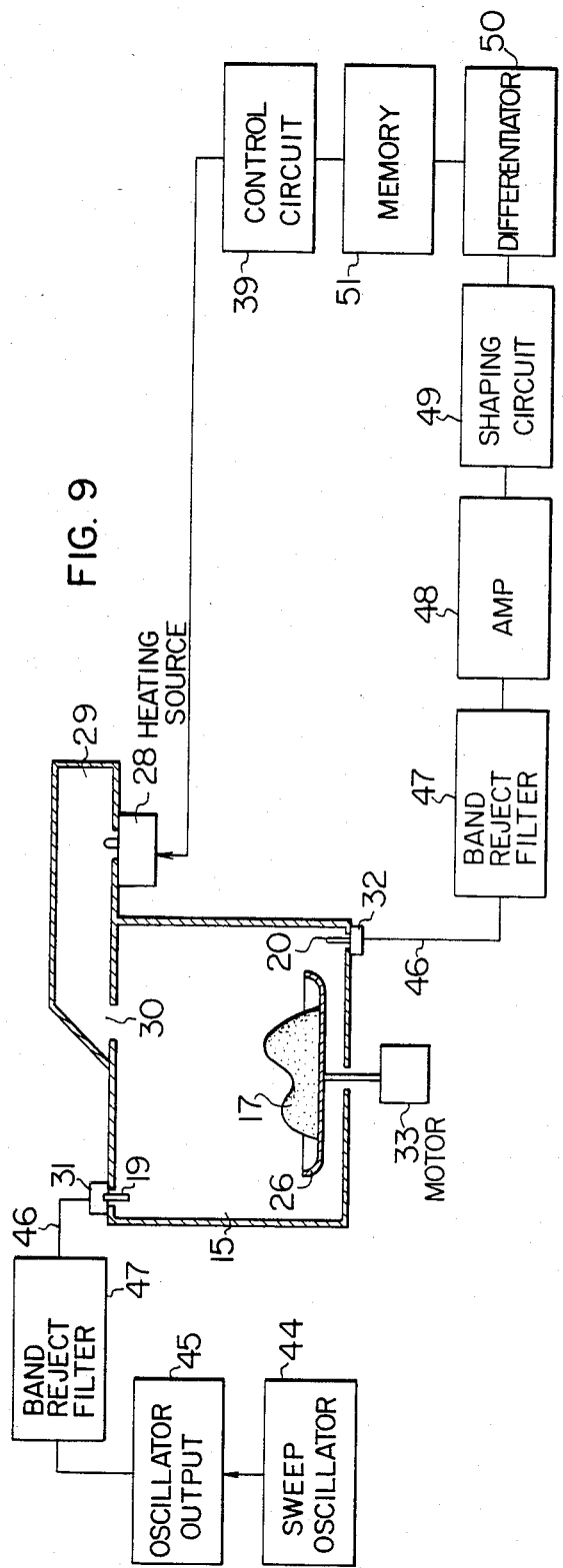
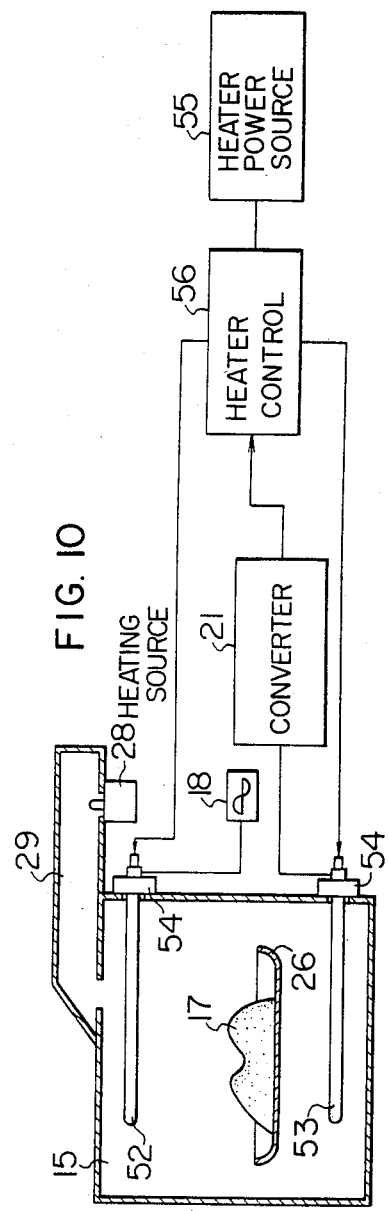

HEATING APPARATUS OF THAWING SENSOR CONTROLLED TYPE

This invention relates to heating apparatus, and more particularly to a heating apparatus of thawing sensor controlled type in which the variation of the rate of wave absorption by an object to be heated due to progressive heating of the object is sensed to detect the degree of thawing of the object being heated, thereby automatically controlling the process of heating for thawing.

Heating apparatus designed for cooking purposes, such as, an electric oven, a gas oven, a high-frequency heating apparatus (a microwave oven) and a steam oven are also used for the purpose of heating to thaw a frozen food which is an object to be heated and placed in a heating cavity of the apparatus. In such an apparatus, the technique of utilizing the dependence of the dielectric loss of a food on the temperature of the food is frequently applied for the determination of the end of thawing of the frozen food. Such a technique is described in, for example, a report entitled "Microwave Heating in the Food Industry." For the purpose of determining the end of thawing of a frozen food, a timer has been employed and suitably set according to the experience to determine the duration of heating required for thawing the frozen food. In such a case, however, it has been very difficult to determine the optimum duration of heating depending upon the factors including the quantity and initial temperature of the frozen food. The employment of the timer for the above purpose has therefore been defective in that over-thawing or under-thawing is frequently given rise to, resulting in undesired boiling of the food in the former case or the necessity for rethawing of the food in the latter case.

In an effort to overcome such a defect, an improved high-frequency heating apparatus has recently been developed in which an infrared sensor is incorporated to measure the temperature of a frozen food being heated thereby detecting the degree of thawing of the frozen food. In this apparatus, the infrared sensor senses the infrared rays radiated from the food so that the absolute temperature of the food can be measured. Thus, the thawing point of the frozen food, that is, the temperature level close to 0° C. can be measured. However, the practical use of the infrared sensor has been encountered with various problems. In the first place, the apparatus having the infrared sensor has been defective in that, although the temperature of the food can be measured, the end of thawing of the frozen food can not necessarily be accurately detected resulting in an inability of accurately identifying the end of thawing at which ice is completely molten away. Secondly, the apparatus has been defective in that measurement is limited to a very narrow view range such as a range for cutting off the high-frequency energy of 2.45 GHz generated from the high-frequency heating source of the high-frequency heating apparatus. Thirdly, the apparatus has been defective in that, because of the small output signal from the infrared sensor, an electronic circuit of complex structure is required for signal processing including separation of noise components and amplification of the noise-free signal.

It is therefore an object of the present invention to solve the prior art problems pointed out above.

Another object of the present invention is to provide a heating apparatus of thawing sensor controlled type in which means are provided for the accurate and reliable automatic control of the process of heating for thawing of a frozen food which is an object to be heated.

In accordance with one aspect of the present invention, there is provided a heating apparatus of thawing sensor controlled type comprising a heating cavity, heating means for heating an object to be heated placed in the heating cavity, transmitting antenna means disposed at a suitable position in the heating cavity for radiating a high-frequency wave signal, means for supplying high-frequency energy to the transmitting antenna means, receiving antenna means disposed in the heating cavity at a position suitably spaced apart from the transmitting antenna means for receiving the wave signal transmitted from the transmitting antenna means, and control means for controlling the operation of the heating means on the basis of the wave signal received by the receiving antenna means, the control means operating to control the heating means when the rate of variation of the level of the wave signal, which is received by the receiving antenna means and varies as the object being heated by the heating means is progressively thawed from its initial frozen state, satisfies a predetermined condition.

The above and other objects, features and advantages of the present invention will be apparent from the following detailed description of preferred embodiments thereof taken in conjunction with the accompanying drawings, in which:

FIG. 9 is a schematic sectional view and a block circuit diagram showing still another embodiment of the heating apparatus of thawing sensor controlled type according to the present invention;

FIG. 10 is a schematic sectional view and a block circuit diagram showing yet another embodiment of the heating apparatus of thawing sensor controlled type according to the present invention;

Figure 1:
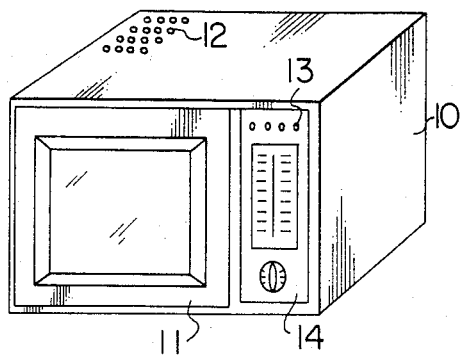
FIG. 1 is an external perspective view of a preferred embodiment of the heating apparatus of thawing sensor controlled type according to the present invention.

FIG. 1 of the drawings is an external perspective view of an embodiment of the heating apparatus of thawing sensor controlled type according to the present invention. Although a heating apparatus provided with the high-frequency heating function finding an ever-increasing demand recently is shown in FIG. 1 by way of example, the present invention is in no way limited to such a high-frequency heating system. The heating apparatus shown in FIG. 1 includes a cabinet 10, a door 11, a plurality of venting perforations 12, a control unit 13, and a display panel 14 including the control unit 13. The control unit 13 includes an actuator mechanism for high-frequency heating, a thawing sensing mechanism, a thawing end display lamp and a thawing end informing buzzer.

Figure 2:
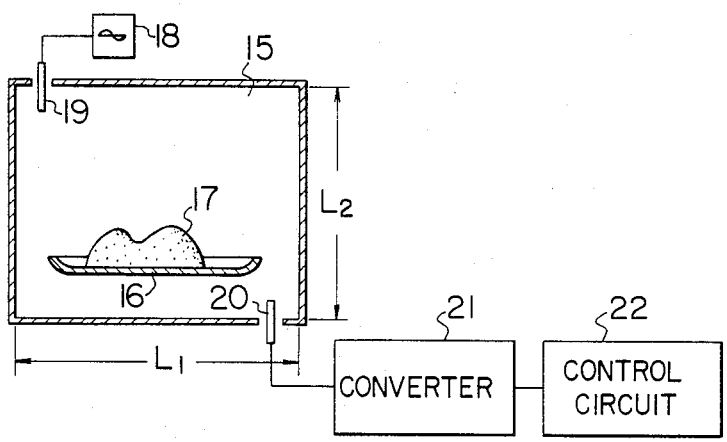
FIG. 2 is a schematic sectional view and a block circuit diagram for illustrating the basic principle of the heating apparatus of thawing sensor controlled type according to the present invention.

FIG. 2 is a schematic sectional view and a block circuit diagram for illustrating the basic principle of the heating apparatus of thawing sensor controlled type according to the present invention. Referring to FIG. 2, the door (not shown) openably closes a heating cavity 15 formed mainly of metal members, and a tray 16 supporting a frozen food 17, which is an object to be heated, thereon is disposed in the heating cavity 15. The frozen food 17 is thawed by the energy supplied from heating means (not shown). This heating means is, for example, a high-frequency heating source or a magnetron generating the high-frequency energy. However, the heating means may be any one of other heaters such as an electric heater, a gas heater or a steam heater. The reference numeral 18 designates a high-frequency signal generator employed in the present invention, and 19 designates a transmitting antenna transmitting the high-frequency signal generated from the high-frequency signal generator 18. A receiving antenna 20 receives the transmitted high-frequency signal, and a converter 21 converts the received wave signal into a voltage signal which is applied to a control circuit 22.

In FIG. 2, the frozen food 17 to be thawed is shown placed on the food supporting tray 16 disposed in the heating cavity 15, and the high-frequency signal wave generated from the high-frequency signal generator 18 is transmitted into the heating cavity 15 from the transmitting antenna 19 to be received by the receiving antenna 20 through the frozen food 17. The frequency of the high-frequency signal wave generated from the high-frequency signal generator 18 differs from the frequency, 2.45 GHz, of the microwave generated from the magnetron (not shown) which is the high-frequency heating source.

The frequency of the high-frequency signal wave generated from the high-frequency signal generator 18 is desirably selected to be substantially equal to or lower than the cut-off frequency determined by the internal dimensions, that is, the width $L_1$, height $L_2$ and depth $L_3$ of the heating cavity 15. (The depth $L_3$ is not shown in FIG. 2.) Depending on the frequency of the high-frequency signal wave and the dimensions of the heating cavity 15, a plurality of standing waves ranging from that of lower order to that of higher order appear in the heating cavity 15, and these standing waves resonate to exhibit a particular resonance characteristic. However, since the presence of these standing waves affects the accuracy of thawing sensing, the frequency of the high-frequency signal wave is so selected that the appearance of the standing waves is suppressed to a minimum thereby minimizing measurement errors due to complex resonance. Even when the frequency of the high-frequency signal wave is so selected, the wave will be reflected a plurality of times in the heating cavity 15 to emerge to the exterior of the heating cavity 15 through the antennas and gaps or to be turned into a heat loss. When the dielectric loss of the food 17 is large, the signal wave is greatly consumed by the food 17, and a small proportion of the signal wave emerges to the exterior of the heating cavity 15 through the antennas and gaps. Further, the rate of absorption of the signal wave by the food 17 is dependent upon the dielectric loss of the food 17 and the temperature dependence of this dielectric loss. Therefore, the signal received by the receiving antenna 20 shows also a pattern peculiar to the food 17.

Figure 3:
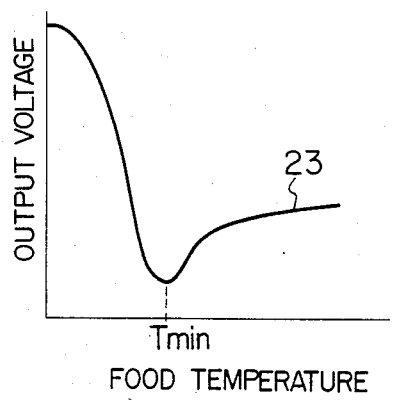
FIGS. 3 and 4 are graphs showing how the sensor output voltage varies relative to the temperature of a food in the basic heating apparatus of the present invention shown in FIG. 2.
Figure 4:
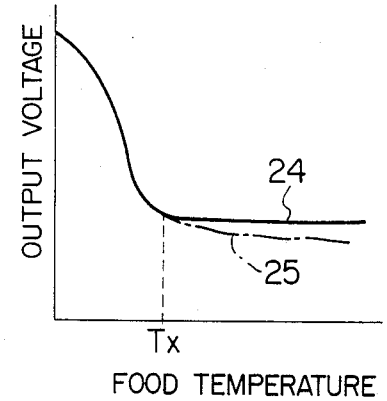

FIGS. 3 and 4 show the relation between the temperature of a frozen food being heated and the sensor output voltage when the signal wave received by the receiving antenna 20 is converted into the corresponding voltage by the converter 21. During thawing of the frozen food whose initial temperature is about $-18°$ C. to $-15°$ C., the output voltage variation characteristics represented by the curves 23, 24 and 25 decrease progressively with heating, and this means that the rate of wave absorption by the food becomes more. The results of actual measurement on various foods for finding the food temperature Tmin providing a least rate of voltage variation or finding the food temperature Tx providing a substantially constant rate of voltage variation have proved that Tmin and Tx are $-3°$ C. to $-1°$ C. At these temperatures Tmin and Tx, water contained in a frozen food is transformed from the state of ice to the state of the so-called cryohydrate in which both of ice and water coexist. Thus, the end of thawing can be detected by detecting the voltage corresponding to the temperature Tmin or Tx. Thus, when a frozen food is progressively heated to be thawed, an abrupt variation occurs in the rate of wave absorption by the food, and this rate of wave absorption becomes maximum at Tmin or Tx. Such a variation in the rate of wave absorption is dependent upon both of the dielectric loss due to the presence of water in the food and the temperature dependence of this dielectric loss. The rate of wave absorption is little when the food is in its frozen states, and becomes maximum when the state of the so-called cryohydrate occurs. As the temperature of the food is further raised beyond the state of the cryohydrate, the rate of wave absorption by the food becomes less again or is maintained substantially constant. In the case of most of frozen foods, the sensor output voltage varies according to the pattern as represented by the curve 23 in FIG. 3, while, in the case of frozen foods containing less water, the sensor output voltage varies according to the pattern as represented by the curve 24 or 25 in FIG. 4. It has been ascertained that, when the food is further continuously heated beyond the point Tmin in FIG. 3 or the point Tx in FIG. 4, the sensor output voltage increases gradually until finally boiling occurs.

Figure 5:
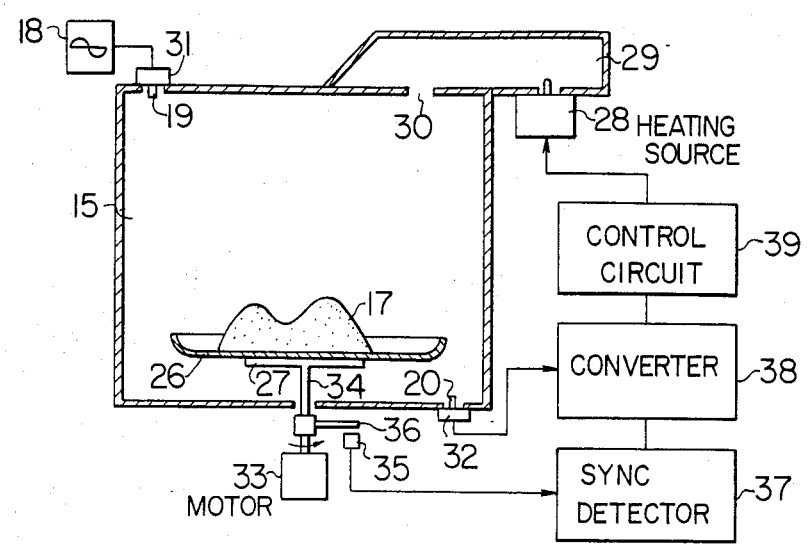
FIG. 5 is a schematic sectional view and a block circuit diagram showing another embodiment of the heating apparatus of thawing sensor controlled type according to the present invention.

FIG. 5 is a schematic sectional view and a block circuit diagram showing another embodiment of the heating apparatus of thawing sensor controlled type according to the present invention, in which a frozen food 17 is placed on a tray 26 mounted on a turntable 27, and, while being rotated, the frozen food 17 is heated to be uniformly thawed by the microwave generated from a magnetron 28 which is the source of high-frequency heating.

Referring to FIG. 5, the high-frequency heating wave generated from the magnetron 28 is guided by a wavegide 29 to be directed toward and into a heating cavity 15 though an energy inlet opening 30. A transmitting-antenna supporting member 31 supports a transmitting antenna 19 and acts also to electrically connect the transmitting antenna 19 to a high-frequency signal source or generator 18 disposed outside of the heating cavity 15. A receiving-antenna supporting member 32 supports a receiving antenna 20 and acts also to electrically connect the receiving antenna 20 to a control system disposed outside of the heating cavity 15. A motor 33 has its drive shaft 34 mechanically connected to the turntable 27 to rotate the turntable 27. A finger-like rotary member 36 is fixed at one end thereof to the motor shaft 34 for rotation with the shaft 34, and a rotation sensing element 35 senses one complete revolution of the rotary member 36 each time the rotary member 36 is rotated to the position opposite thereto. A synchronous detector 37 detects the output pulse signal from the rotation sensing element 35. This output pulse signal from the synchronous detector 37 is applied to a converter 38 together with the high-frequency signal received by the receiving antenna 20, so that the high-frequency signal can be converted into the corresponding voltage by the converter 38 during the pulse period of the pulse signal appearing from the rotation sensing element 35. The output voltage signal from the converter 38 is applied to a control circuit 39 which controls the high-frequency heating source 28.

Figure 6:
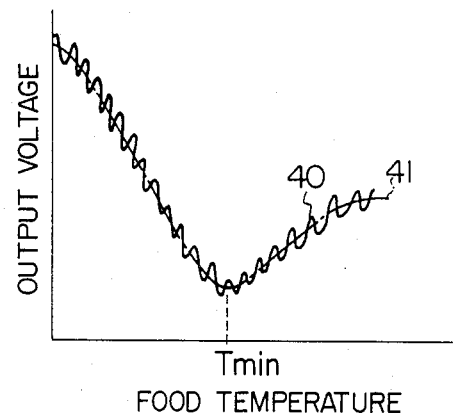
FIGS. 6, 7 and 8 are graphs showing how the sensor output voltage varies relative to the temperature of a food and relative to time in the embodiment of the present invention shown in FIG. 5.
Figure 7:
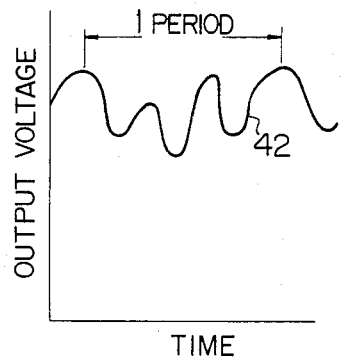
Figure 8:
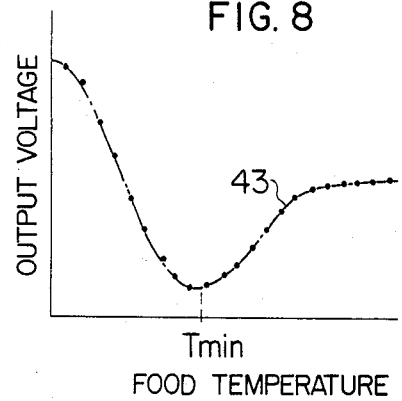

The output voltage signal of the converter 38 in FIG. 5 pulsates as shown by the waveform 40 in FIG. 6 when it is generated intact, and the mean value of the waveform 40 (the mean value of the output voltage per revolution of the turntable 27) provides a curve 41 as shown in FIG. 6. Depending on the factors including the quantity and shape of the food 17, the output voltage appearing from the converter 38 during one complete revolution of the turntable 27 varies as shown by the waveform 42 in FIG. 7, and the output voltage with such a waveform 42 is generated to follow up the variation of the temperature of the food 17. In such a case, therefore, it is preferably to average the total output voltage appearing from the converter 38 during one complete revolution of the food 17 rotating in unitary relation with the rotation of the turntable 27 or to continuously monitor and measure the voltage value at the same portion only of the output voltage waveform 42 appearing from the converter 38 during rotation of the food 17 rotating together with the turntable 27. In this manner, the rotation signal generated from the rotation sensing element 35 and the high-frequency signal received by the receiving antenna 20 are applied to the converter 38, so that the high-frequency signal can be converted into the corresponding voltage by the converter during the pulse period of the pulse signal appearing from the rotation sensing element 35, and the resultant voltage signal is applied from the converter 38 to the control circuit 39. Thus, in this case, the output voltage of the converter varies intermittently as shown by the curve 43 in FIG. 8. Even in such a case, additional heating may be applied to the food 17 for a required length of time when or after the level of the output voltage signal of the converter 38 reaches the point Tmin where the rate of voltage variation is least, and, then, heating is ceased for automatically ending the process of heating for thawing.

FIG. 9 is a schematic sectional view and a block circuit diagram showing still another embodiment of the heating apparatus of thawing sensor controlled type according to the present invention. The embodiment shown in FIG. 9 is a modification of that shown in FIG. 5.

Referring to FIG. 9, the reference numeral 44 designates a sweep oscillator. Preferably, this sweep oscillator 44 generates an oscillation output 45 of several-ten mW when incorporated in microwave ovens for home use. The oscillation signal 45 generated from this sweep oscillator 44 is applied through a band rejection filter 47 and a signal transmission path 46 to the transmitting antenna 19 supported by the antenna supporting member 31 to be directed into the heating cavity 15 in which a frozen food 17 is placed on the tray 26 mounted on the turntable (not shown) driven by the motor 33. The band rejection filter 47 is provided so that the high-frequency wave or microwave of 2.45 GHz for heating the food 17 may not leak to the exterior of the heating cavity 15 via the signal transmission path 46. The signal transmitted from the transmitting antenna 19 is received by the receiving antenna 20 supported by the antenna supporting member 32. The signal received by the receiving antenna 20 passes through a similar band rejection filter 47, an amplifier 48, a wave shaping circuit 49, a differentiation circuit 50 and a memory and comparison circuit 51 to be applied to the control circuit 39. Because of the above arrangement, the high-frequency oscillation output of small power generated from the sweep oscillator 44 can be discriminated from the high-frequency oscillation output of large power generated from the heating source 28, thereby obviating troubles including maloperation of the apparatus. The sweep oscillator 44 is connected to the transmitting antenna 19 for the reason that the largest absorption wavelength differs depending on the composition of foods, and, therefore, the transmitting wave is swept to ensure sensing at the largest absorption wavelength. The differentiation circuit 50 is provided to deal with the absence of the least rate of output voltage variation as shown at 24 or 25 in FIG. 4. The differentiation circuit 50 differentiates the received signal so that the control circuit 39 controls the high-frequency heating source 28 when the absolute value of the differentiation output becomes close to a value close to zero.

FIG. 10 is a schematic sectional view and a block circuit diagram showing yet another embodiment of the heating apparatus of thawing sensor controlled type according to the present invention. The embodiment shown in FIG. 10 is a modification of the basic embodiment shown in FIG. 2. More precisely, two vertically spaced, additional heating sources or electric heaters provided in one form of high-frequency heating apparatus are utilized as a transmitting antenna and a receiving antenna respectively.

Referring to FIG. 10, an upper electric heater 52 and a lower electric heater 53 connected to a heater power source 55 through a heater control circuit 56 function as a transmitting antenna and a receiving antenna respectively. A choke structure 54 is provided for each of the heaters 52 and 53 so that the high-frequency wave or microwave of 2.45 GHz generated from the high-frequency heating source or magnetron 28 and directed toward and into the heating cavity 15 through the waveguide 29 may not leak to the exterior of the heating cavity 15 via the heaters 52 and 53. The surface of each of these heaters 52 and 53 is electrically insulated from the wall surface of the heating cavity 15 and also from the heater power source 55. Therefore, these heaters 52 and 53 can be regarded as independent antennas and actually sufficiently exhibit the antenna effect. The heater control circuit 56 is also connected to the converter 21 for controlling the generation of heat in response to the output of the converter 21.

Figure 11:
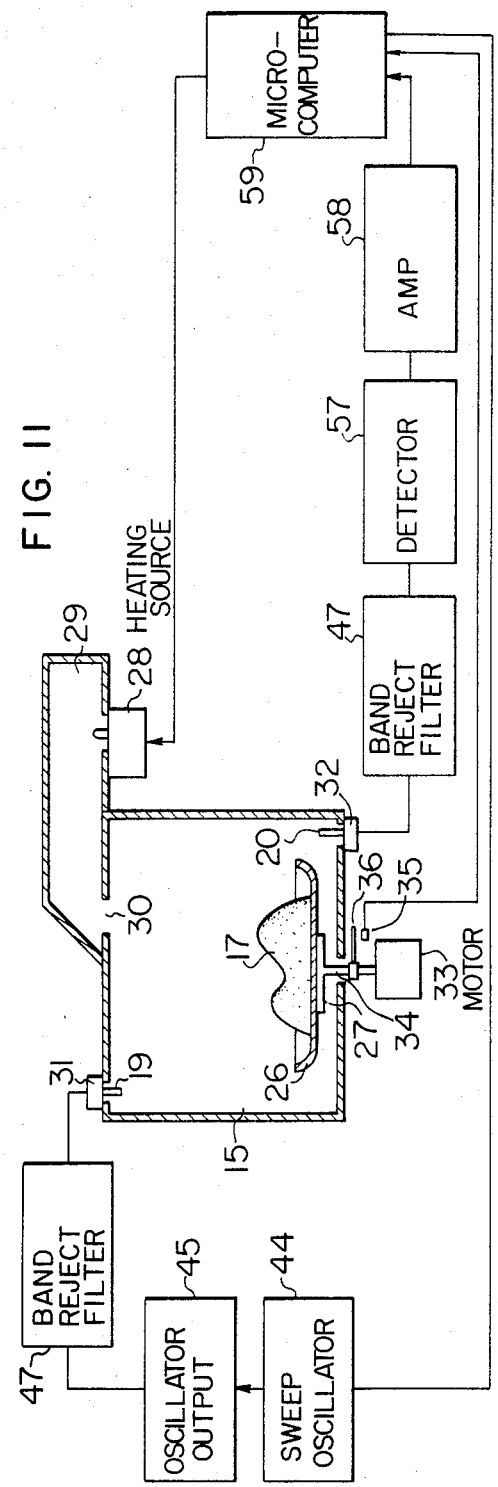
FIG. 11 is a schematic sectional view and a block circuit diagram showing a further embodiment of the heating apparatus of thawing sensor controlled type according to the present invention.

FIG. 11 is a schematic sectional view and a block circuit diagram of a further embodiment of the heating apparatus of thawing sensor controlled type according to the present invention. The embodiment shown in FIG. 11 is a modification of those shown in FIGS. 5 and 9. In FIG. 11, means are provided for setting the timing of measurement of the output voltage of the thawing sensor during the process of heating, thereby more accurately controlling the process of heating for thawing.

In the case of, for example, the heating apparatus shown in FIG. 5, the high-frequency output of 2.45 GHz generated from the magnetron 28 is strong or in the order of 500 W to 600 W when the magnetron 28 is continuously oscillating. Therefore, for the purpose of heating a frozen food which may be boiled or ruptured when too strongly heated, resulting in impairment of the external appearance of the food, it is a common practice to apply so-called mild heating to the food by intermittently energizing the magnetron 28, for example, by energizing the magnetron 28 for 4 seconds and then ceasing the energization of the magnetron 28 for contiguous 4 seconds and repeating such an energization mode, that is, by varying the duty factor thereby reducing the mean energization power per unit time. Suppose that, while the high-frequency wave is being generated from the magnetron 28 energized in the manner above described, the high-frequency signal wave different from the high-frequency wave or microwave generated from the magnetron 28 is generated at the same timing from the high-frequency signal generator or sweep oscillator 44 to be transmitted from the transmitting antenna 19 shown in FIG. 9. The former oscillation output is large or in the order of several-hundred W, whereas the latter oscillation output is small or in the order of several-ten mWatt. Consequently, part of the fundamental frequency of 2.45 GHz or various higher harmonics will be superimposed on the oscillation signal frequency being transmitted from the transmitting antenna 19 or will provide the source of radio noise. In such a case, it will be difficult to separate such noise components from the wave signal received by the receiving antenna 20, and accurate sensing of the end of thawing will become difficult. In the embodiment shown in FIG. 11, in order to avoid such a trouble, the signal wave is transmitted from the transmitting antenna 19 at timing different from the timing of generation of the high-frequency wave or microwave from the magnetron 28, so that transmission, reception and measurement of the thawing sensing signal can be completed during the period of time in which the magnetron 28 is not oscillating.

Figure 12:
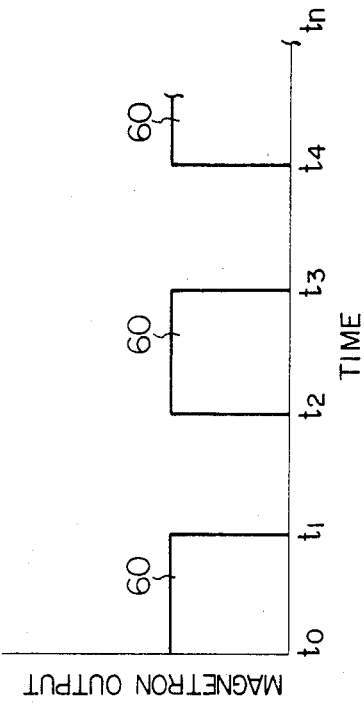
FIG. 12 shows the waveform of the output from the magnetron in the heating apparatus shown in FIG. 11.

Referring now to FIG. 11, the high-frequency signal wave 45 generated from the sweep oscillator 44 passes through the band rejection filter 47 to be directed into the heating cavity 15 from the transmitting antenna 19. After being absorbed by a frozen food 17, the signal wave is received by the receiving antenna 20 to be applied to a microcomputer 59 through the band rejection filter 47, a detection circuit 57 and an amplification circuit 58. The microcomputer 59 applies a command signal for intermittently energizing the magnetron 28, so that the magnetron 28 generates its high-frequency output intermittently as shown by the waveform 60 in FIG. 12. In FIG. 12, the period of time of from $t_0$ to $t_1$ is equal to the period of time of from $t_2$ to $t_3$. In each of the durations of energization $t_0$–$t_1$ and $t_2$–$t_3$, the high-frequency signal is not generated from the sweep oscillator 44. In each of the periods of time $t_1$–$t_2$ and $t_3$–$t_4$ following the periods of time $t_0$–$t_1$ and $t_2$–$t_3$ respectively, the magnetron 28 is not energized, and the sweep oscillator 44 is energized under command of the microcomputer 59. The high-frequency signal generated from the sweep oscillator 44 is directed into the heating cavity 15 from the transmitting antenna 19, and the signal received by the receiving antenna 20 is applied to the microcomputer 59 through the circuits 47, 57 and 58. In this manner, the signal wave is measured in each of the periods of time $t_1$–$t_2$ and $t_3$–$t_4$. Therefore, the radio interference attributable to the high-frequency wave generated from the magnetron 28 can be obviated by making the signal measurement in the period of time in which the magnetron 28 is not energized.

Preferably, this period of time in which the magnetron 28 is cut off lasts for at least the length of time during which the turntable 27 makes one complete revolution. While the rotation sensing element 35 senses, for example, one complete revolution of the turntable 27, the signal wave received by the receiving antenna 20 after wave absorption by the food 17 placed on the tray 26 supported on the turntable 27 is measured a plurality of times, and the mean value of the results of measurement is computed. Then, the mean value is, for example, differentiated until the rate of variation of the received signal becomes zero or substantially constant, and, as soon as such a point is reached, the microcomputer 59 applies the control signal to the magnetron 28 to complete the process of heating for thawing.

Figure 13:
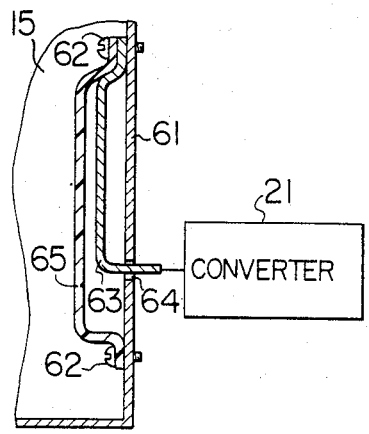
FIG. 13 is a schematic sectional view showing principal parts of another antenna structure preferably employed in the heating apparatus of thawing sensor controlled type according to the present invention.

FIG. 13 is a schematic sectional view showing principal parts of another transmitting and receiving antenna structure preferably employed in the heating apparatus of thawing sensor controlled type according to the present invention.

Referring to FIG. 13, a metal bar or plate is suitably bent to form a loop antenna 63 which is fixed at one end thereof to an internal wall surface 61 of the heating cavity 15 by a set screw 62 and the other end of which extends to the exterior through a cut-out portion 64 of the heating cavity 15 to be connected to the converter 21. A cover 65 made of a heat-resistive, electrical insulating nonmetallic material covers the loop antenna 63. Employment of such an antenna structure is advantageous in that the internal space of the heating cavity 15 can be more efficiently utilized and can be more easily cleaned than in the case of the aforementioned embodiments, since the antenna does not protrude into the heating cavity 15 unlike the dipole antenna employed in the aforementioned embodiments.

Figure 14:
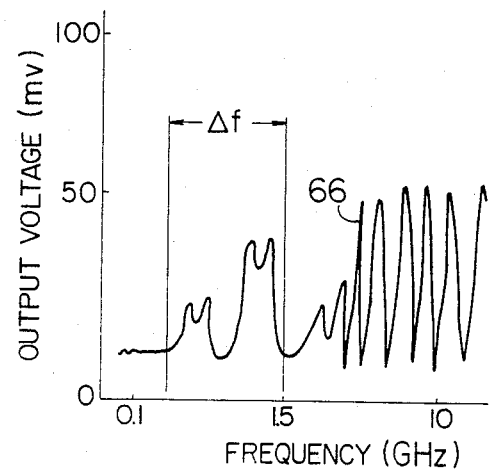
FIG. 14 is a graph showing the relation between the transmitted wave frequency and the received signal level in the heating apparatus of thawing sensor controlled type according to the present invention.

FIG. 14 is a graph showing the relation between the transmitted signal frequency and the level of the signal received by the receiving antenna 20. The characteristic curve 66 represents the output voltage of the converter 21 which converts the received signal level into the corresponding voltage. The sweep range $\Delta F$ of the sweep frequency is preferably from 0.1 GHz to 1.5 GHz although it depends upon the volume of the heating cavity 15. It is also preferable to select and utilize such a sweep waveform that the waveform of the output voltage is not deformed but its amplitude is merely reduced when it is absorbed by a frozen food which is placed in the heating cavity 15 and is heated by the microwave.

Figure 15:
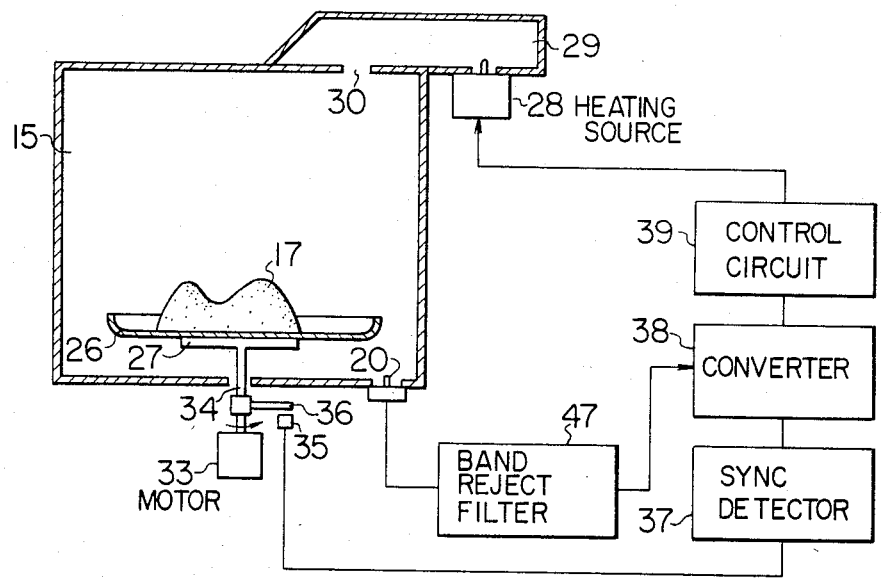
FIG. 15 is a schematic sectional view and a block circuit diagram showing a still further embodiment of thawing sensor controlled type according to the present invention.

FIG. 15 is a schematic sectional view and a block circuit diagram showing a still further embodiment of the heating apparatus of thawing sensor controlled type according to the present invention. The embodiment shown in FIG. 15 is a simplified modification of that shown in FIG. 5 or 9 in that the high-frequency signal generator 18 or the sweep oscillator 44 generating the signal wave to be transmitted is eliminated. In FIG. 15, a wave having a frequency different from the fundamental frequency (2.45 GHz) among various frequencies included in the high-frequency wave generated from, for example, the magnetron 28 is selectively received by the receiving antenna 20 so as to sense and control thawing on the basis of the received wave signal. The embodiment shown in FIG. 15 is advantageous in that its cost is lower than the others.

It will be understood from the foregoing detailed description of the present invention that, for the purpose of controlling the process of heating for thawing of a frozen food, the change in the characteristic, that is, the change in the dielectric loss of the food due to progressive heating and also the temperature dependence of this dielectric loss are utilized to detect the level variation of a signal wave absorbed by the food until the rate of variation of the voltage obtained by converting the received signal wave into the corresponding voltage becomes least or substantially constant in the course of thawing, so as thereby to automatically detect the end of thawing. The present invention is therefore advantageous in that a frozen food can be thawed without the possibility of over-thawing or under-thawing. Further, according to the present invention, once the optimum period of time of heating required until the least or substantially constant rate of variation of the voltage obtained by conversion of the received wave signal is reached, is found, the process of heating for thawing under the same conditions can be repeated on a frozen food of the same kind and the same weight by setting the timer on the basis of the thus found optimum heating period and placing the new frozen food in the heating cavity. This is very convenient for industrial thawing of frozen foods. Further, in the present invention, heating can be further continuously applied to a food for a suitable length of time after detection of the end of thawing when it is preferable to apply such additional heating to the food. This additional heating period of time may be determined by computing it as a certain proportion of the heating period of time required until the end of thawing and may be stored in the memory of a microcomputer used for control of heating.

The transmitting antenna and receiving antenna may be disposed adjacent to the left and right corners respectively of the rear wall surface of the heating cavity without degrading the ability of thawing end detection.

What is claimed is:

1. A heating apparatus of thawing sensor controlled type comprising:
   a heating cavity;
   heating means for heating an object to be heated placed in said heating cavity;
   transmitting antenna means disposed at a suitable position in said heating cavity for radiating a high-frequency wave signal;
   means for supplying high-frequency energy to said transmitting antenna means;
   receiving antenna means disposed in said heating cavity at a position suitably spaced apart from said transmitting antenna means for receiving the wave signal transmitted from said transmitting antenna means;
   control means for controlling the operation of said heating means on the basis of the wave signal received by said receiving antenna means, said control means operating to control said heating means when the rate of variation of the level of the wave signal, which is received by said receiving antenna means and varies as said object being heated by said heating means is progressively thawed from its initial frozen state, satisfies a predetermined condition;
   a turntable disposed in said heating cavity for rotation while carrying the object thereon; and
   means for sensing the rotation of said turntable;
   said control means measuring the wave signal received by said receiving antenna means each time said rotation sensing means senses a predetermined angular position of rotation of said turntable.

2. A heating apparatus as claimed in claim 1, wherein said heating means is one of an electric heater, a high-frequency energy generator, a gas heater and a steam heater or a suitable combination thereof.

3. A heating apparatus as claimed in claim 1, wherein each of said transmitting antenna means and said receiving antenna means is covered with a cover of a heat-resistive, electrical insulating, nonmetallic material.

4. A heating apparatus as claimed in claim 1, wherein said transmitting antenna means and said receiving antenna means are disposed in said heating cavity at positions such that said object placed in said heating cavity is interposed between said antenna means.

5. A heating apparatus as claimed in claim 1, wherein said means supplying the high-frequency energy to said transmitting antenna means is constructed to cause frequency resonance within said heating cavity, and said receiving antenna means receives the frequency resonance wave.

6. A heating apparatus as claimed in claim 1, wherein the frequency of the wave signal supplied from said high-frequency energy supplying means to said transmitting antenna means is in the range of from 0.1 GHz to 1.5 GHz.

7. A heating apparatus as claimed in claim 1, wherein the frequency of the wave signal supplied from said high-frequency energy supplying means to said transmitting antenna means is equal to the cut-off frequency determined by the internal dimensions of said heating cavity.

8. A heating apparatus as claimed in claim 1, wherein, when a high-frequency energy generator is provided as said heating means, the frequency of the wave signal supplied from said high-frequency energy supplying means to said transmitting antenna means has a value different from 2.45 GHz which is the fundamental frequency of the wave generated from said high-frequency energy generator.

9. A heating apparatus as claimed in claim 1, wherein said high-frequency energy supplying means is a sweep oscillator generating a high-frequency signal having a predetermined band width.

10. A heating apparatus as claimed in claim 1, wherein an intermittently oscillating high-frequency energy generator controlled to be intermittently turned on-off is provided as said heating means, and said control means controls said heating means so that the wave signal is received by said receiving antenna means to be measured during only the cut-off period of said intermittently oscillating high-frequency energy generator.

11. A heating apparatus as claimed in claim 1, wherein said control means controls said heating means when the rate of variation of the level of the wave signal received by said receiving antenna means becomes least or minimum.

12. A heating apparatus as claimed in claim 1, wherein said control means controls said heating means when the rate of variation of the level of the wave signal received by said receiving antenna means becomes substantially constant.

13. A heating apparatus as claimed in claim 1, wherein said control means includes arithmetic processing means for differentiating the wave signal received by said receiving antenna means to compute the rate of variation of the received wave signal with time, thereby controlling said heating means.

14. A heating apparatus as claimed in claim 1, wherein said control means is constructed so that, after detection of the end of thawing of the object, additional heating of the object can be further continued for a predetermined period of time.

15. A heating apparatus of thawing sensor controlled type comprising:
a heating cavity;
heating means for heating an object to be heated placed in said heating cavity;
transmitting antenna means disposed at a suitable position in said heating cavity for radiating a high-frequency wave signal;
means for supplying high-frequency energy to said transmitting antenna means;
receiving antenna means disposed in said heating cavity at a position suitably spaced apart from said transmitting antenna means for receiving the wave signal transmitted from said transmitting antenna means;
control means for controlling the operation of said heating means on the basis of the wave signal received by said receiving antenna means, said control means operating to control said heating means when the rate of variation of the level of the wave signal, which is received by said receiving antenna means and varies as said object being heated by said heating means is progressively thawed from its initial frozen state, satisfies a predetermined condition;
a turntable disposed in said heating cavity for rotation while carrying the object thereon; and
means for sensing the rotation of said turntable;
said control means computing the mean value of a plurality of wave signals received by said receiving antenna means during each rotation period of said turntable whose rotation is sensed by said rotation sensing means and applying a control signal indicative of the computed mean value to said heating means.

16. A heating apparatus as claimed in claim 15, wherein said transmitting antenna means and said receiving antenna means are disposed in said heating cavity at positions such that said object placed in said heating cavity is interposed between said antenna means.

17. A heating apparatus as claimed in claim 15, wherein the frequency of the wave signal supplied from said high-frequency energy supplying means to said transmitting antenna means is in the range of from 0.1 GHz to 1.5 GHz.

18. A heating apparatus as claimed in claim 15, wherein the frequency of the wave signal supplied from said high-frequency energy supplying means to said transmitting antenna means is equal to the cut-off frequency determined by the internal dimensions of said heating cavity.

19. A heating apparatus as claimed in claim 15, wherein, when a high-frequency energy generator is provided as said heating means, the frequency of the wave signals supplied from said high-frequency energy supplying means to said transmitting antenna means has a value different from 2.45 GHz which is the fundamental frequency of the wave generated from said high-frequency energy generator.

20. A heating apparatus as claimed in claim 15, wherein an intermittently oscillating high-frequency energy generator controlled to be intermittently turned on-off is provided as said heating means, and said control means controls said heating means so that the wave signal is received by said receiving antenna means to be measured during only the cut-off period of said intermittently oscillating high-frequency energy generator.

21. A heating apparatus as claimed in claim 15, wherein said control means is constructed so that, after detection of the end of thawing of the object, additional heating of the object can be further continued for a predetermined period of time.

22. A heating apparatus of thawing sensor controlled type comprising:
a heating cavity;
means for supplying high-frequency energy toward and into said heating cavity for the dielectric heating of an object to be heated placed in said heating cavity;
receiving antenna means for receiving a wave signal of a suitably selected frequency included in the high-frequency wave generated from said high-frequency energy supplying means;
control means for controlling the operation of said high-frequency energy supplying means on the basis of the wave signal received by said receiving antenna means, said control means operating to control said high-frequency energy supplying means when the rate of variation of the level of the wave signal, which is received by said receiving antenna means and varies as said object being heated is progressively thawed from its initial frozen state, satisfies a predetermined condition;
a turntable disposed in said heating cavity for rotation while carrying the object thereon; and
means for sensing the rotation of said turntable;
said control means measuring the wave signal received by said receiving antenna means each time said rotation sensing means senses a predetermined angular position of rotation of said turntable.

23. A heating apparatus as claimed in claim 22, wherein a frequency of a wave signal supplied from said high-frequency energy supplying means is in the range of from 0.1 GHz to 1.5 GHz.

24. A heating apparatus as claimed in claim 22, wherein a frequency of a wave signal supplied from said high-frequency energy supplying means is equal to the cut-off frequency determined by the internal dimensions of said heating cavity.

25. A heating apparatus as claimed in claim 22, wherein said control means is constructed so that, after detection of the end of thawing of the object, additional heating of the object can be further continued for a predetermined period of time.

26. A heating apparatus of thawing sensor control type comprising:

a heating cavity;

means for supplying high-frequency energy toward and into said heating cavity for the dielectric heating of an object to be heated placed in said heating cavity;

receiving antenna means for receiving a wave signal of a suitably selected frequency included in the high-frequency wave generated from said high-frequency energy supplying means;

control means for controlling the operation of said high-frequency supplying means on the basis of the wave signal received by said receiving antenna means, said control means operating to control said high-frequench energy supplying means when the rate of variation of the level of the wave signal, which is received by said receiving antenna means and varies as said object being heated is progressively thawed from its initial frozen state, satisfies a predetermined condition;

a turntable disposed in said heating cavity for rotation while carrying the object thereon; and means for sensing the rotation of said turntable;

said control means computing the mean value of a plurality of wave signals received by said receiving antenna means during each rotation period of said turntable whose rotation is sensed by said rotation sensing means and applying a control signal indicative of the computed mean value to said high-frequency energy supplying means.

27. A heating apparatus as claimed in claim 26, wherein a frequency of a wave signal supplied from said high-frequency energy supplying means is in the range of from 0.1 GHz to 1.5 GHz.

28. A heating apparatus as claimed in claim 26, wherein a frequency of a wave signal supplied from said high-frequency energy supplying means is equal to the cut-off frequency determined by the internal dimensions of said heating cavity.

29. A heating apparatus as claimed in claim 26, wherein said control means is constructed so that, after detection of the end of thawing of the object, additional heating of the object can be further continued for a predetermined period of time.

* * * * *